United States Patent

[11] 3,621,129

[72] Inventor Colin Fisher
Meldreth, Royston, England
[21] Appl. No. 820,532
[22] Filed Apr. 30, 1969
[45] Patented Nov. 16, 1971
[73] Assignee Metals Research Limited
Melbourn, Royston, England
[32] Priority May 1, 1968
[33] Great Britain
[31] 20,612/68

[54] DETECTION DEVICES FOR IMAGE ANALYSIS SYSTEMS

17 Claims, 12 Drawing Figs.

[52] U.S. Cl. 178/6.8
[51] Int. Cl. H04n 7/02
[50] Field of Search 178/61; 235/92; 178/6, 6.8

[56] References Cited
UNITED STATES PATENTS

| | | | |
|---|---|---|---|
| 3,049,588 | 8/1962 | Barnett | 178/6 |
| 2,803,406 | 8/1957 | Nuttall | 178/6 |

*Primary Examiner*—Robert L. Griffin
*Assistant Examiner*—Barry Leibowitz
*Attorney*—Beveridge & DeGrandi

ABSTRACT: Detection devices for image analysis systems employing line scanning in which detection is in part governed by inspecting video signal from portions of scan lines intersecting a feature under analysis other than that currently being scanned.

In one device a reference level voltage for threshold detection is generated by generating mean of the whitest and blackest signal levels of image portions immediately before and after that currently under analysis so that the reference threshold is constantly equated to the black and white content of the image under analysis.

In another device the inspection of image portions before and after that currently under analysis allow a decision to be made as to whether the current portion is inside or outside a feature defined only by a boundary having an unsymmetrical density profile.

Another system allows a tentative detection decision to be made from the information from one portion of a line scan and a final detection decision to be made after comparing the provisional decision with a later decision based on information from preceding and following line scanned portions relative to that on which the tentative decision was made.

INVENTOR:
COLIN FISHER
BY

INVENTOR:
COLIN FISHER
BY [illegible]
ATTORNEYS

INVENTOR:
COLIN FISHER
BY Beveridge & DeGrandi
ATTORNEYS

INVENTOR:

BY

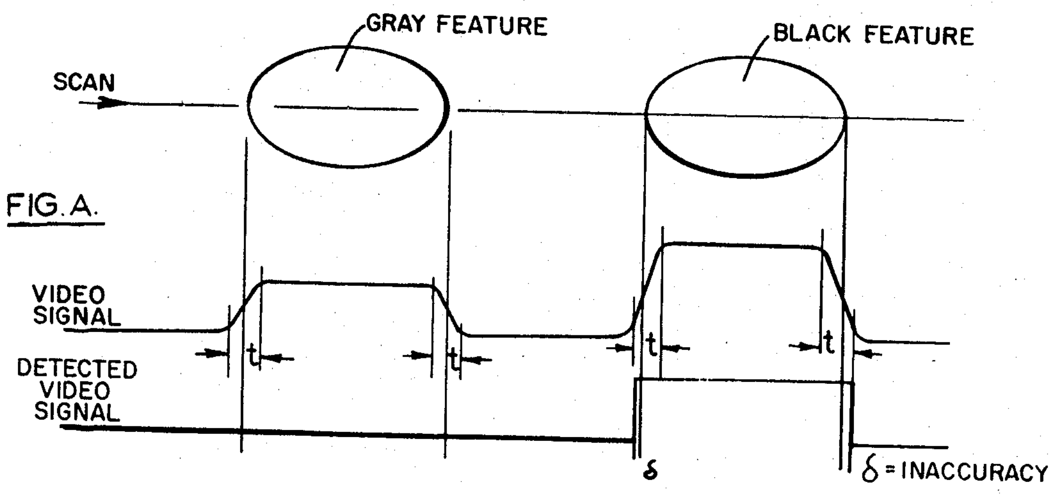
FIG. 5.
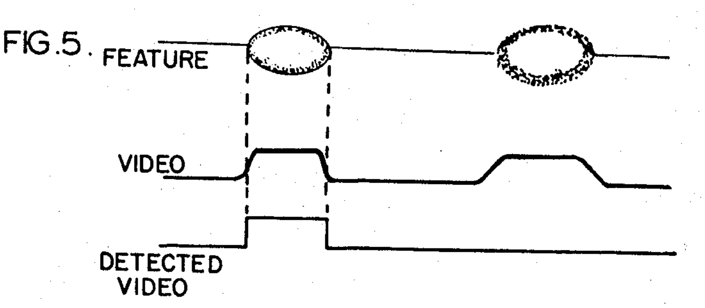
INVENTOR:
BY

INVENTOR:
COLIN FISHER
BY [illegible]
ATTORNEYS

Figure 6:
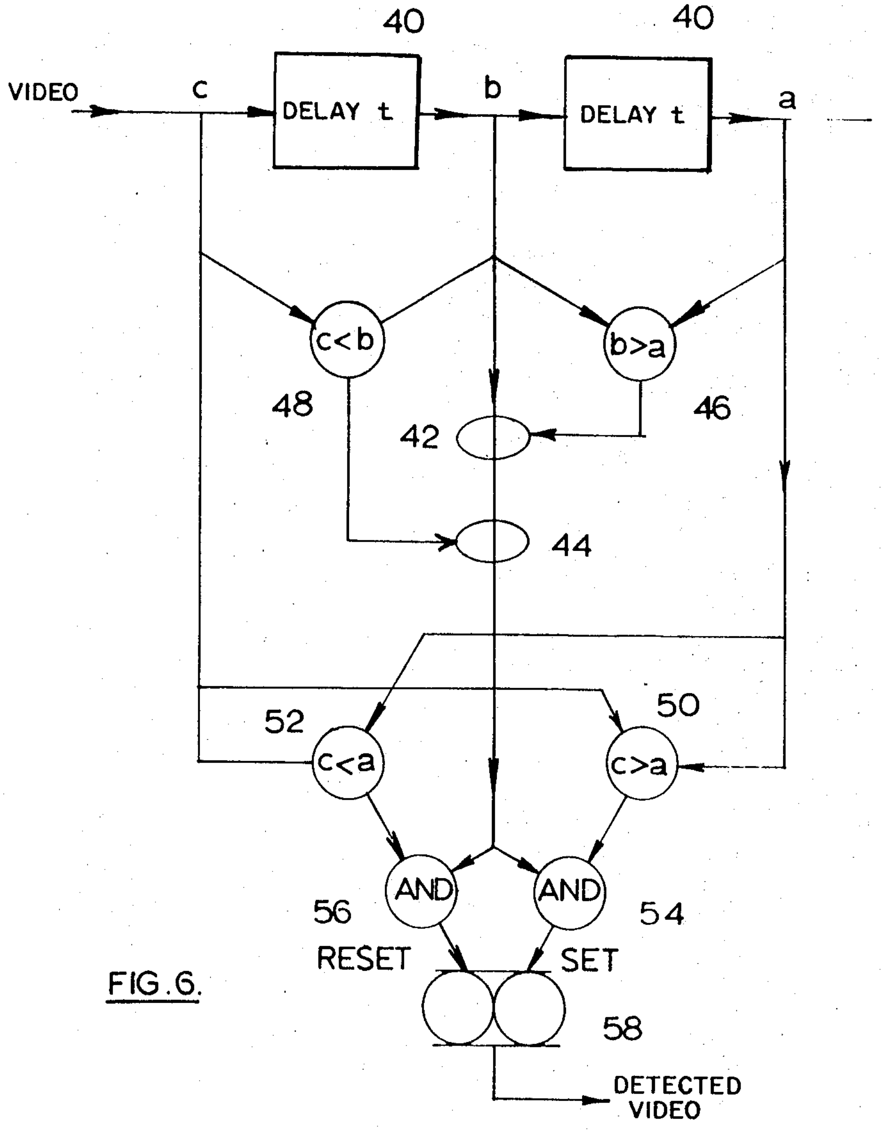

FIG. 6.a.
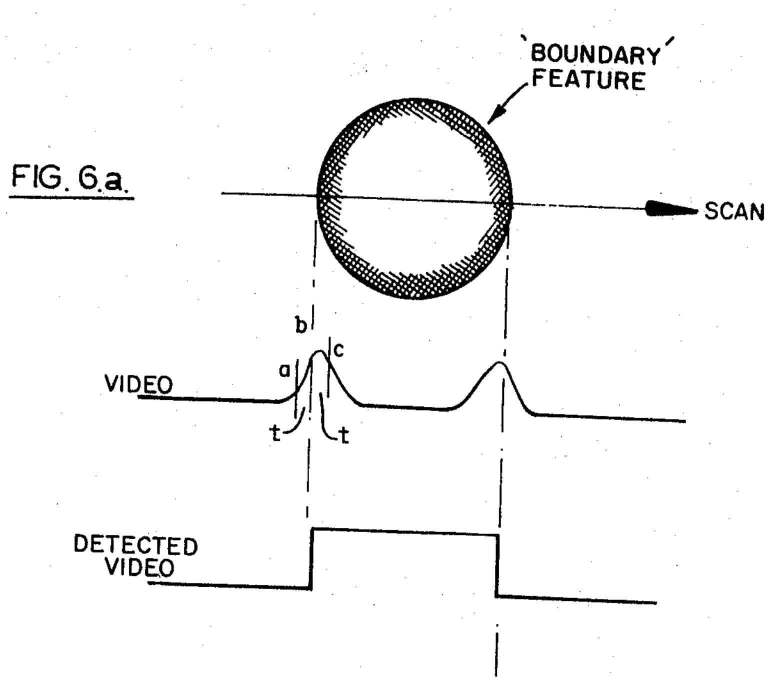
FIG. 7
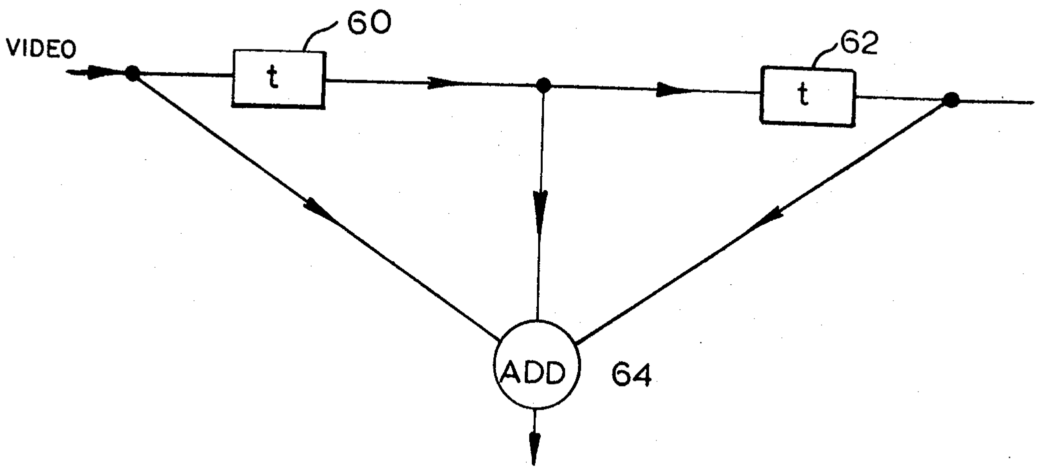
INVENTOR:
BY

INVENTOR:
BY

INVENTOR:

BY

INVENTOR:

BY

DETECTION DEVICES FOR IMAGE ANALYSIS SYSTEMS systems This invention concerns image analysis sytems and in particular detection devices therefor.

In general an image containing features to be analyzed is scanned by an inspection spot in a series of lines. The resulting variations in optical intensity are converted to an electronic signal exactly comparable to a television video waveform. To this end a television camera is employed and where microscopic specimens are concerned this is coupled to a light microscope.

A video signal has a limited response to fine detail and its characteristic resolution is determined inter alia by the bandwidth of any electronic equipment through which the signal passes, the resolution of any optical system employed and the effective size of the scanning spot. The waveform will therefore have a finite time of response to any change in the specimen. By the process of "detection" the practical video signal is modified into a two-state binary signal, one state corresponding to the desired part of the image and the other corresponding to the undesired part.

Any detection system has two important characteristics, first, its selection accuracy i.e. the reliability with which it takes the binary decision of including or excluding parts of the image and second its positional accuracy with which it takes the decision. FIG. A shows a typical video signal resulting from a scan traversing two features of different grey values and the same video signal after passing through a hypothetical detection circuit which has been set so as to select only the black features. This is achieved by detecting relative to a reference voltage intermediate the grey and black levels and an inaccurate decision could result if the background level varied as between the two features. In the case illustrated the circuit has made an accurate selection and a binary signal only appears for the black feature. However, it also illustrates how a positional inaccuracy can occur since a larger "chord" will be obtained if a detection decision is made at the bottom of the pulse than if it is made nearer the top of the pulse. This is due to the sloping leading and trailing edges of the video signal pulse which are in turn due to finite spot size and limited bandwidth and means that any subsequent circuitry responsive to the detected video signal will be presented with a feature apparently larger or smaller than it should be and two features of the same actual size but detected at different levels could be sized differently.

A picture reproducer has been described in an article by Heinz Laass in Radio Mentor, Apr. 1958, in which a reference voltage is generated from a background signal at the beginning of each line scan of an image and a detected video signal is derived by gating an AC signal of constant frequency when the video signal amplitude during the line scan exceeds the reference voltage set for that line. It is claimed that signal changes corresponding to variations in background color (which occur in a frame scan direction but which are constant for the duration of a line scan) can be eliminated from the detected video signal.

It will be readily understood that variations in background color which occur along a line scan, cannot be corrected by the apparatus described above, nor will the apparatus correct for variations in the sensitivity of a source of video signal which is subject to so-called "shading" error. Whereas this limited form of correction is useful when reproducing signed checks (given as the preferred use for the apparatus described in the Radio Mentor article), it is not sufficient for general image analysis in which variation in background can occur in any direction.

Furthermore, this apparatus in no way corrects for positional inaccuracies described above.

It is therefore an object of the present invention to provide a detection device which will accurately select features according to their grey level relative to a local background, independently of any grey level variations in the background.

A subsidiary object is to provide a detection device in which the position at which a detection decision is made is independent of the setting of a selection threshold.

The invention therefore provides an improved detection device for an image analysis system employing line scanning in which a reference voltage for controlling detection of a video signal of the image is generated during scanning of the image, in that the reference voltage is derived from video signal corresponding to an image portion other than that currently being detected but in constant geometrical relation thereto in the image.

In order to remove directional characteristics of the device proposed by the present invention, the reference voltage is preferably also derived from video signal from image portions close to the one from which the currently detected video signal is derived but in line scans before and after that containing the one image portion.

According to a preferred aspect of the present invention a detection device for detecting features having a desired edge or boundary density profile for an image analysis system employing line scanning is characterized by signal generating means responsive to video signal to generate signals corresponding signal content of image portions before and after that currently under analysis at any instant and means responsive to said generated signals controlling detection in dependence on the relative values of the generated signals.

According to a further preferred aspect of the present invention a device for use with a detector in an image analysis system employing line scanning comprises means for generating a provisional item of information (such as a tentative detection decision) from a portion of the total scan information available, means for storing the information for a period of time and comparison means for comparing the stored information with other information arising later in the scan by a constant interval of time and means to generate a final item of information (such as a confirmation or denial of a tentative detection decision) in response to the comparison.

Other objects and advantages of the present invention will be apparent from the accompanying drawings and description thereof.

Figure 1:
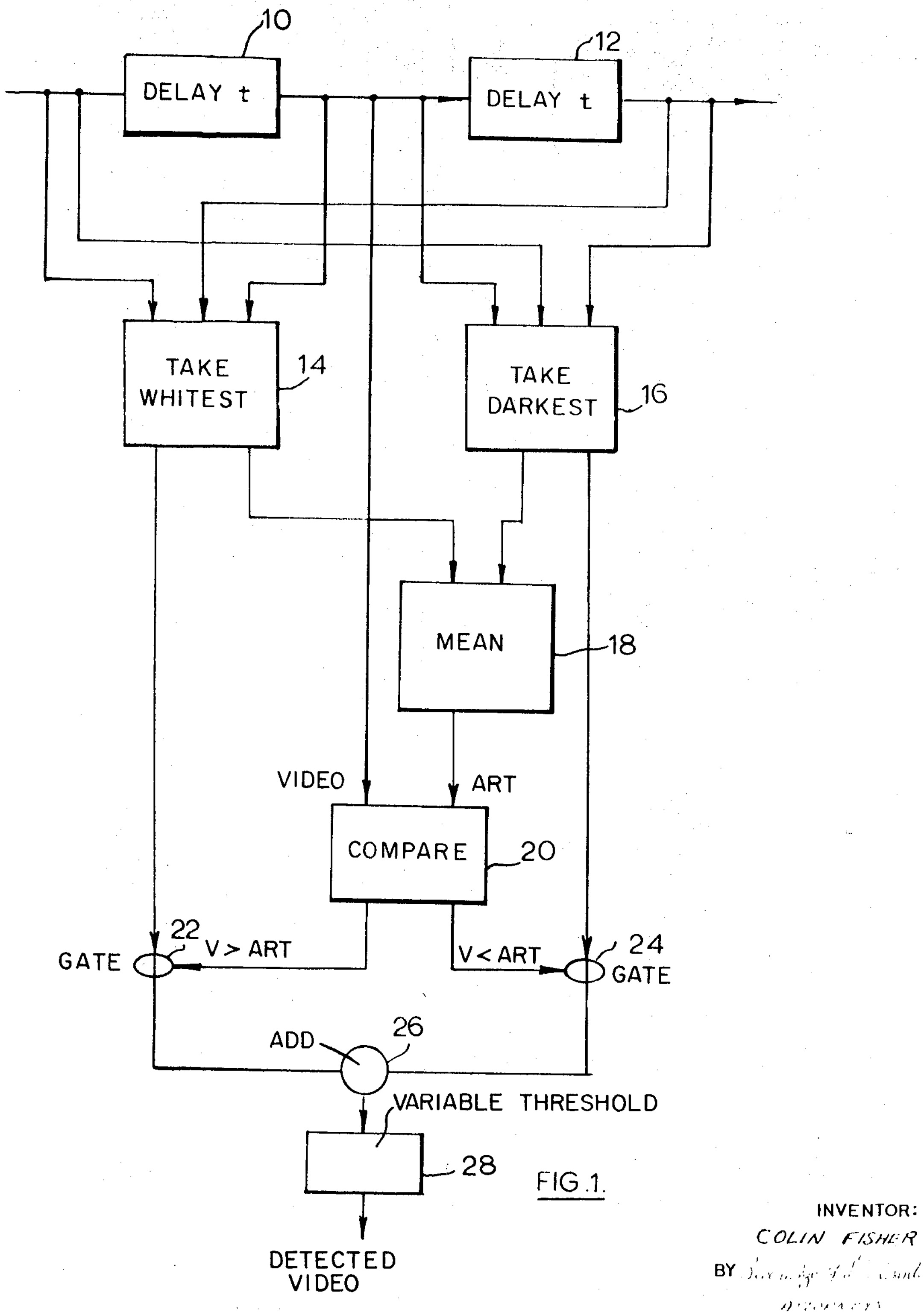
Figure 2:
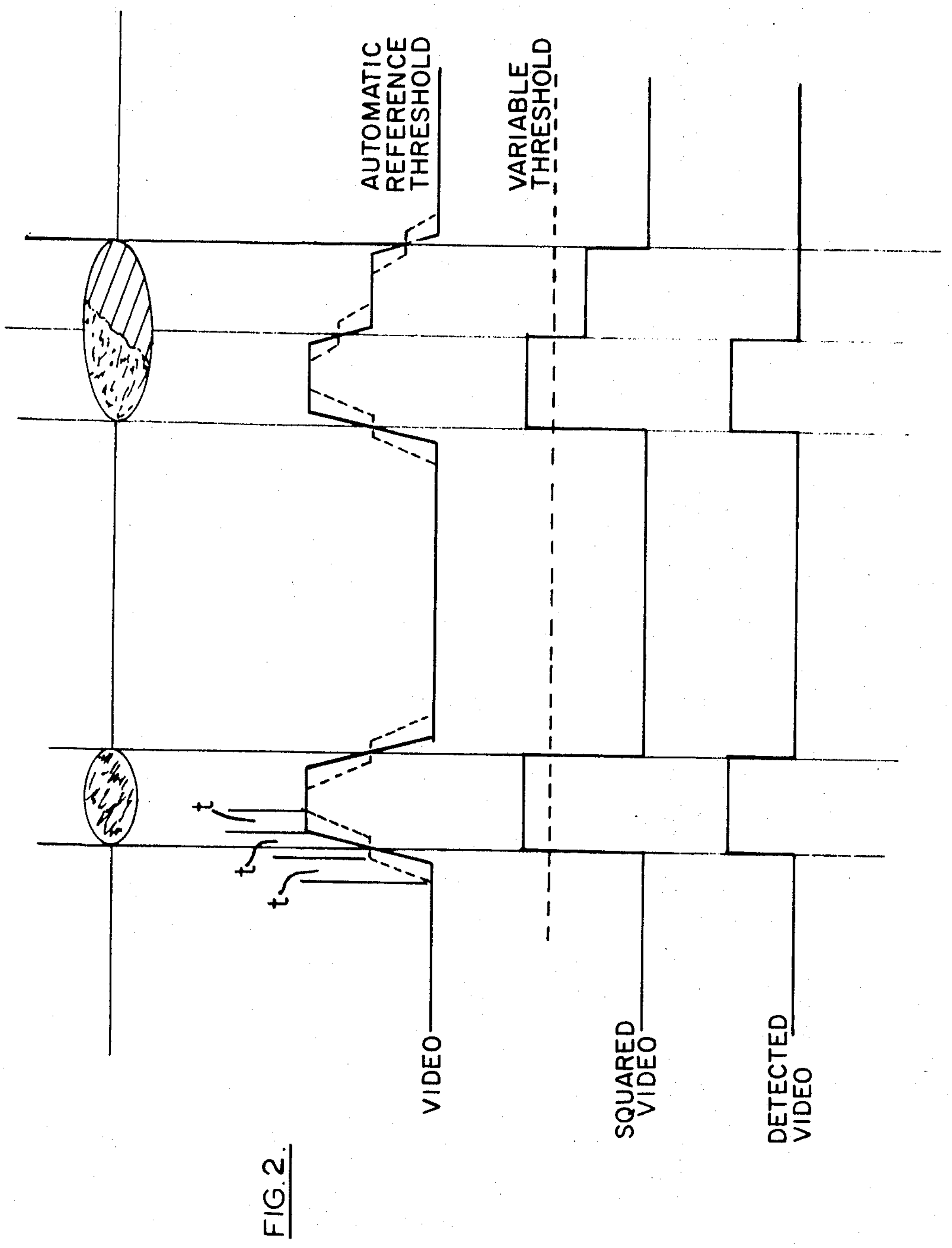
Figure 3:
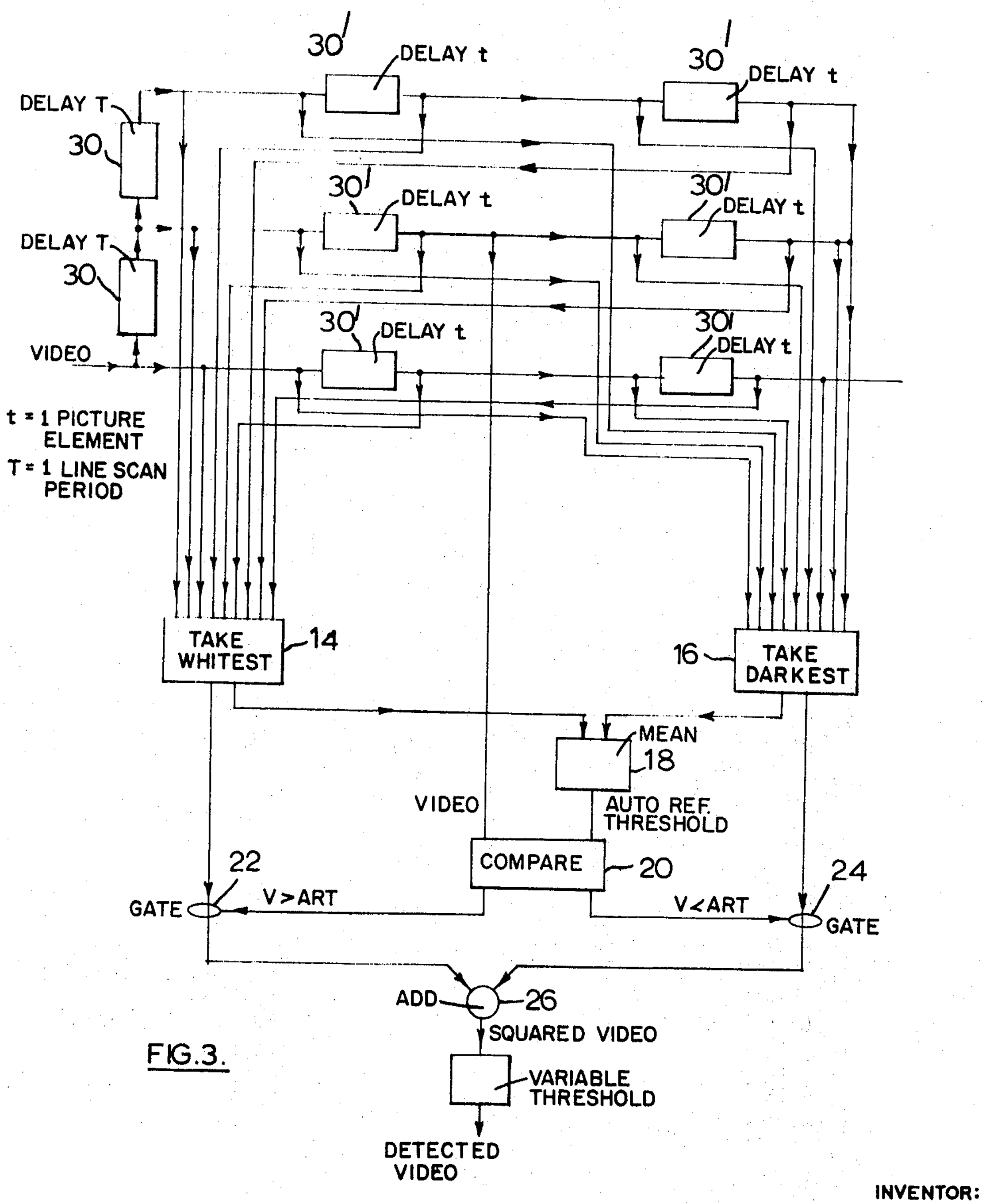
Figure 4:
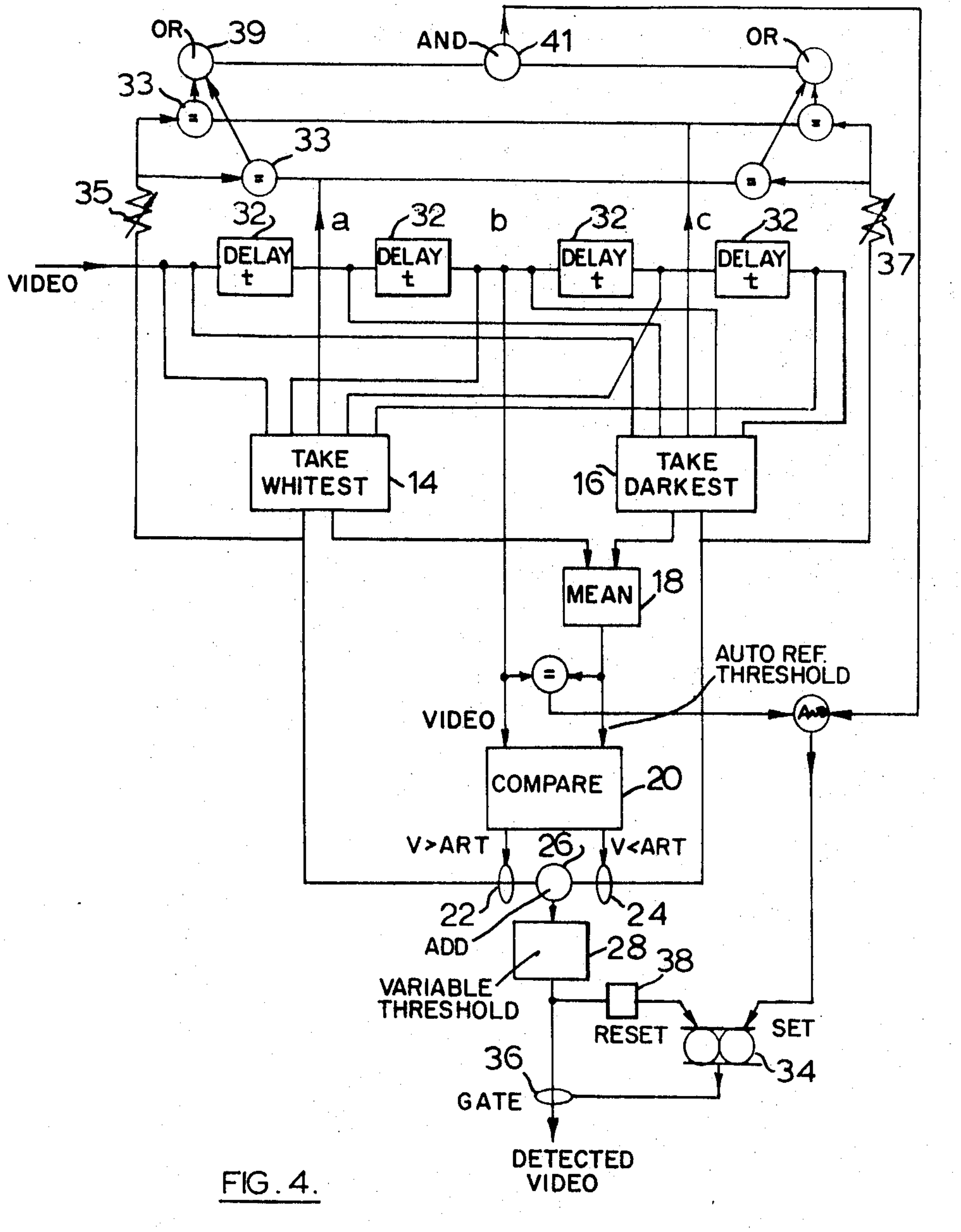
Figure 8:
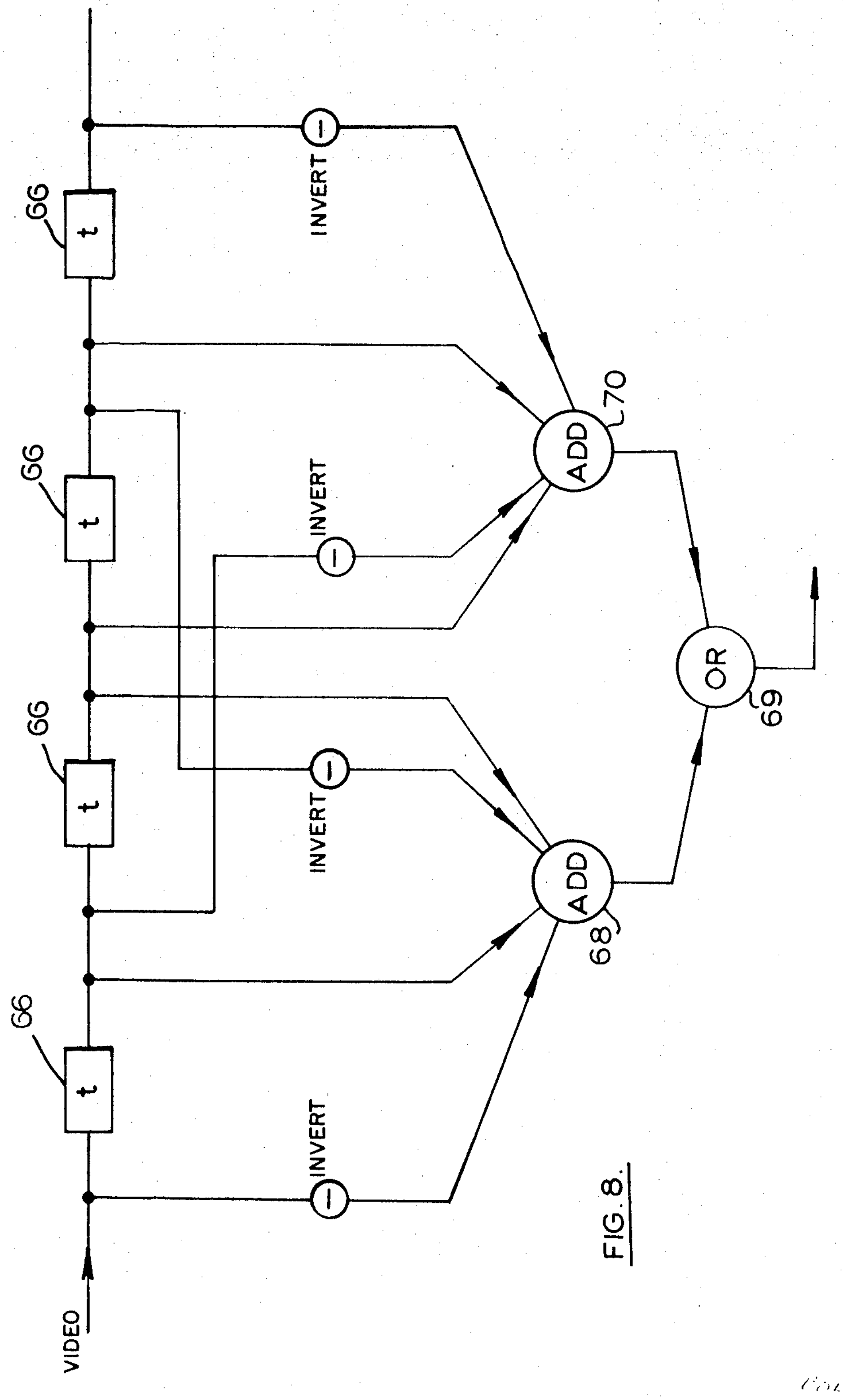
Figure 9:
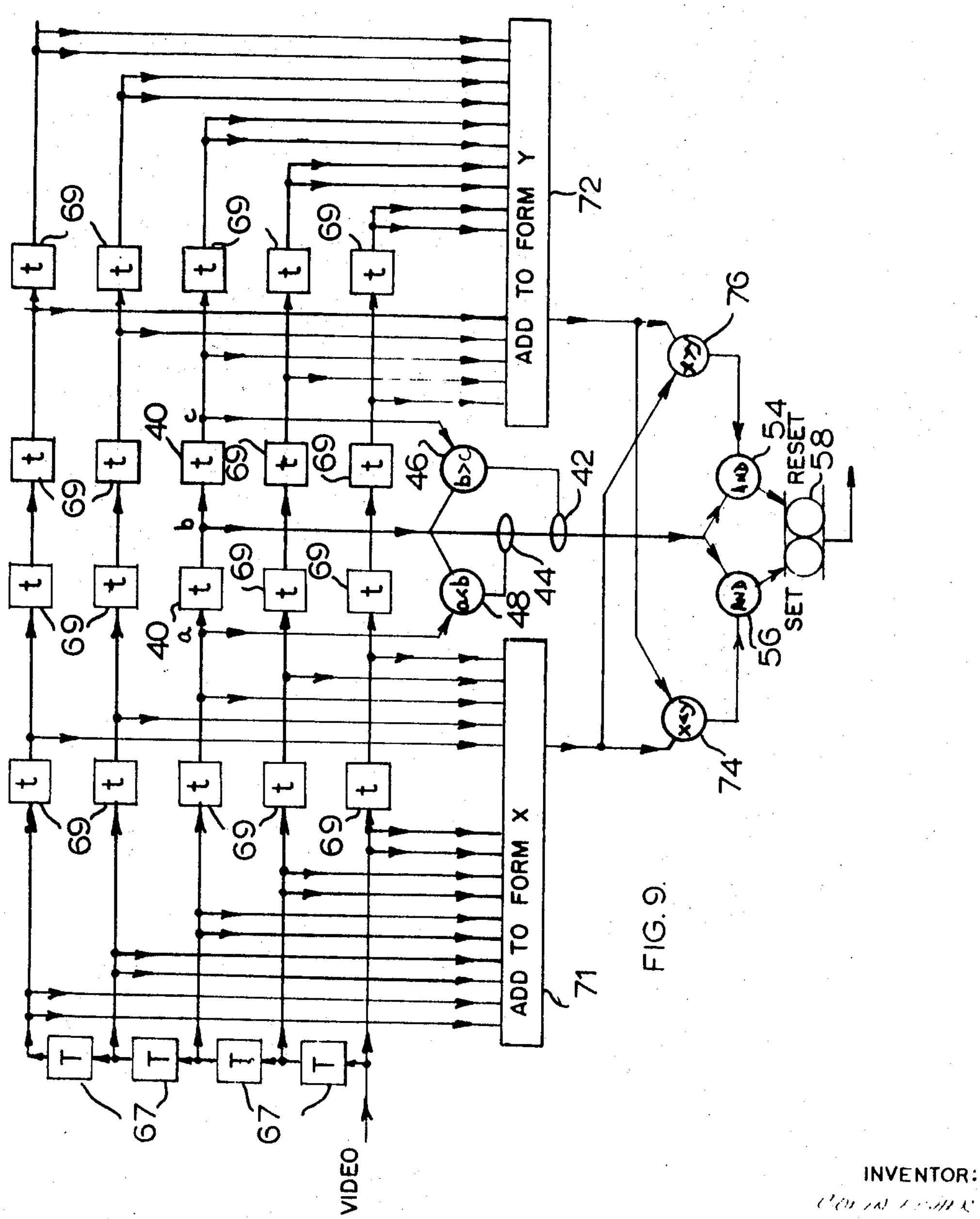
Figure 10:
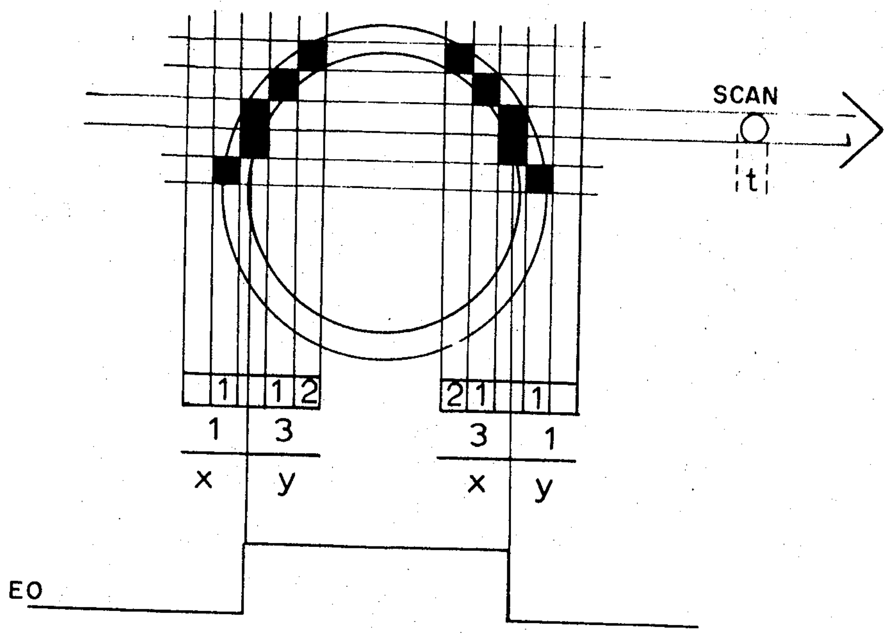
Figure 11:
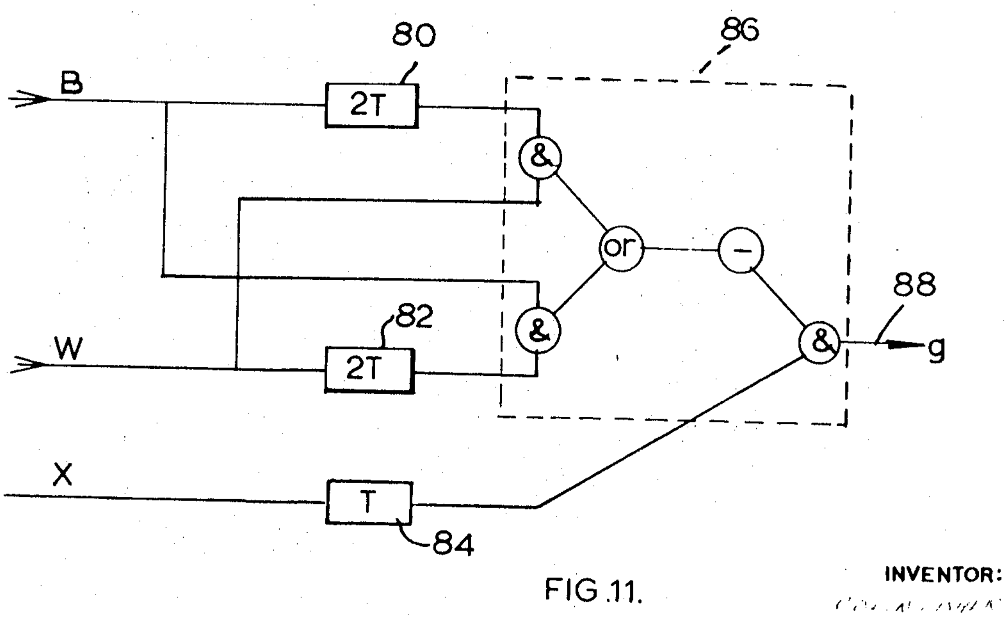

FIG. 1 is a block schematic circuit diagram of one embodiment of the invention,

FIG. 2 illustrates graphically signal waveforms at different points of the circuit of FIG. 1, FIG. 3 illustrates a second embodiment, FIG. 4 illustrates an embodiment of the second aspect of the invention which is arranged to detect only in focus features by inspecting edge density variation, FIG. 5 illustrates graphically signal waveforms at different points of the circuit of FIG. 4, FIG. 6 illustrates another embodiment of the second aspect of the invention which is arranged to inspect boundary density variation to determine whether the spot is inside or outside a boundary feature, FIG. 6A illustrates waveforms associated with FIG. 6, FIGS. 7 and 8 illustrate two modifications which can be fitted (but not necessarily) to any of the embodiments of FIGS. 1, 3, 4 or 6, FIG. 9 illustrates another detection device similar to that shown in FIG. 6 for detecting boundary features, FIG. 10 illustrates graphically the operation of the device of FIG. 9, and FIG. 11 illustrates a combined arrangement.

FIG. 1 illustrates a system which employs a variable threshold which is automatically set to a fixed fraction of the local change in video signal. In this way the size of the detected signal is governed by a logical criterion related to the true feature size. Typically the variable threshold is set to one half the local video signal change.

Two delays 10, 12 are connected in series so that three video signals identical but separated in time can be derived from one video signal. Since the scanning spot moves at a fixed velocity the three video signals can be thought of as being separated by picture elements along the scan. If each delay has a time delay equal to the rise time of the system, and if the rise time is primarily caused by the spot size (as is usual) the spacing will be commensurate with the spot size. The expression "rise time" is used to mean the time occupied by the amplitude change in the video signal output of the system, as the spot scans across a boundary between two distinctly contrasting areas, both areas being larger than the spot. Two circuit blocks 14, 16 are connected to the delays 10, 12 and select the whitest and darkest picture points. A third circuit 18 finds the mean of the whitest and darkest points to provide the automatic reference threshold. The video signal from the first delay 10 is compared in a comparator 20 with the automatic reference threshold and one of two gates 22, 24 is operated depending on whether the video signal is above or below the automatic reference threshold. The two gates 22, 24 allow the passage of a signal corresponding either to the whitest or to the darkest picture points, to an adding stage 26. The output from 26 therefore consists of a video signal with abrupt changes in place of what were originally slow changes, limited by the system resolution $t$. A variable threshold 28 allows the selection of the required part of the video signal. More than one variable threshold 28 can be used when a band of optical density information is required.

It is important to notice that many more than two delays can be used so as to allow the system to operate correctly on parts of the video signal whose rise time is longer than $t$, and this is indeed necessary when examining features with edges lying anything but perpendicular to the scan direction.

The delays 10, 12 are preferably delay lines but any suitable memory device can be used.

If the resolution of the system is limited by the size of the scanning spot then the criterion illustrated is correct for determining the true feature size. If the resolution is limited by optical effects, such as diffraction or perhaps electronic effects such as bandwidth limitation, then other criteria should be used and the value of the automatic reference threshold should be derived according to the relevant law.

This system greatly reduces detection decision inaccuracy caused by background variation or shading. It also greatly reduces or eliminates detection inaccuracies caused by fixed reference thresholds, and variable thresholds.

It does however slightly worsen the effect of electrical "-noise." This will lead to a slight increase in both detection decision errors and detection inaccuracies arising from this cause. It can also make both detection decision errors and detection inaccuracies in regions where more than two levels of video come very close together. If for instance black and white regions are separated by a small amount of grey region, the squared video signal can ignore the existence of the grey region altogether. Fortunately, neither of these is a serious disadvantage in practice and the most serious disadvantage of this circuit is the apparent detection of two grey regions at the top and bottom of high contrast features due to finite spot size. This can be reduced to a minimum by making the spacing between horizontal scanning lines equal to the size of the spot so that the "grey" regions are limited to one line thickness.

FIG. 2 is a graphical illustration of idealized video signals at various points in the system shown in FIG. 1.

A similar system to that shown in FIG. 1, is illustrated in FIG. 3. Here an array of delays 30 is arranged so that the automatic reference threshold can be derived not merely from nearby points in the same line but also nearby points in preceding and succeeding scanning lines. In this way the directional dependence of the automatic reference threshold is removed and it will always set itself correctly with respect to the local contrast change irrespective of the angle between the scan direction and the edge of a feature. The arrangement illustrated shows a three-by-three matrix of delays 30 connected so that the central point in time supplies the video signal for subsequent video signal for treatment by a detection circuit. This central video signal is preceded and followed by video signals from the matrix which correspond to a ring of picture elements around the picture element corresponding to the central video signal, which control the automatic reference threshold. Of course many more delay lines can be added to the matrix so as to optimize operation and this is sometimes necessary because the resolution is defined in terms of less than 100 percent transition between black and white so that adjacent picture points are also affected by the presence or otherwise of a feature on a particular picture element. It is therefore sometimes advantageous to sense darkest and whitest picture elements slightly further removed than one picture element from the picture point under consideration.

The arrangement of FIG. 3 is a two-dimensional arrangement in which the delays 30 forming the matrix are of two types. One type corresponds to the delay required between adjacent picture elements in one line and the other type corresponds to the delay between adjacent and close picture elements in adjacent lines. It will be appreciated that the delay required for the second type of delay will be very much greater than the delay required in the former.

In a more complicated arrangement three two-dimensional matrices as illustrated in FIG. 3 could be connected together by two delay devices (not shown) each corresponding to the total frame scan period. Video signals could then be obtained corresponding to a ring of picture elements from each of three successive frames. A device (not shown) could be included to alter the focus of the overall system between each successive frame by a small fixed amount. This variation in focus would represent a third dimension and by comparing the video signals from the successive frames, the risk that slightly defocused regions of high contrast features may be detected as grey features can be substantially reduced.

It will be appreciated that the same technique may be employed where color television techniques are employed to allow for separate comparison of the color signals.

The remainder of the system shown in FIG. 3 is similar to that shown in FIG. 1 and will not be described in detail.

It is also possible to take into account the variation of density around any particular picture element and allow the density variation to influence detection of the video signal corresponding to the picture element in question. One such arrangement is shown in FIG. 4. One application of this arrangement would be as a circuit for the rejection of features which are not exactly in focus. The problem of out of focus features often occurs in examination of three-dimensional objects and if some circuit such as this is not included then the resulting video signal can be biased in favor of the larger size features which might be detected despite severe misfocusing. The arrangement shown in FIG. 4 is basically similar to an arrangement of FIG. 5 but includes the additional circuit elements required for the analysis of the surrounding density variation.

In FIG. 4, four delays 32 are connected in series whereby four delayed video signals can be obtained making, with the original video signal, five video signals in all. The delay introduced by each delay 32 will determine the spacing of the picture elements in the line of scan corresponding to the five video signals and all five signals are used to find the whitest and darkest levels in the same way as shown in FIG. 1. The second and fourth video signals are extracted and subjected to logic criteria in equality modules 33 which demand that they should equal or exceed a certain percentage of the darkest or whitest points (the means for determining this percentage being shown diagrammatically at 35, 37) in order that the detected video can appear at the output of the system. To this end electronic gates 39, 41 are provided. Thus if the condition is not satisfied at any time when the detected video would normally be passed to the output (i.e. the video supplied to the comparator 20 just equals or just exceeds the automatic reference threshold) then a gating bistable circuit 34 is not operated and no output is supplied from the system since a gate 36 operated by the gating bistable circuit 34 remains closed. If on the other hand the criterion is satisfied when the video supplied to the comparator 20 just equals or just exceeds the automatic reference threshold, then the bistable 34 is set and the gate 36 opened to allow detected video to pass as output.

The bistable 34 reset line is supplied from a detector circuit 38 which detects the end of a detected video signal so that the bistable 34 is reset ready for the next feature.

In the arrangement shown in FIG. 4 exact equality is demanded of the values of the second and fourth video signals but in practice it is envisaged that it would be more useful to impose limits rather than exact equality criteria on the values of these two video signals so as to define a maximum degree of misfocus. Alternatively the system could include more delays so that the density variation of the edge of the feature is gauged over more picture elements than five. For example, it might be required to detect dark features which have a thin grey surrounding layer but reject those features which do not have such a surrounding layer. It will be appreciated that by applying the appropriate criteria to the extracted video signals and into passing detected video when the criteria are satisfied, such a circuit could be employed to distinguish between such features.

It will be further appreciated that further delays may be employed corresponding to the time between adjacent lines and/or between adjacent frames as described with reference to FIG. 3.

FIG. 5 is a graphical illustration of two differing outputs of feature and the idealized video signals resulting therefrom. The left-hand feature is in focus whereas the right-hand feature is not in focus. By employing the circuit of FIG. 4 the left-hand feature will be detected but no detected output will appear in the out of focus feature.

The application of an automatic reference threshold may also be employed in the detection of a feature having only a boundary. Here we are dealing with a type of feature which does not in general have a different grey level within the boundary from that outside. This often means that it is a matter of guesswork to determine which is the feature and which is the surrounding grey area. Fortunately features of this type often have an asymmetrical boundary density profile (see FIG. 6A). FIG. 6 illustrates a system which is arranged to detect a boundary feature and to decide whether a scan is entering or leaving a feature on a basis of the local density variations.

FIG. 6A is a graphical illustration of a boundary feature on asymmetrical boundary density profile and an idealized video signal resulting therefrom. The two-state, detected video signal indicating the difference between the outside and inside of the boundary is also shown. It will be seen that for equal intervals of time *t* each side of the "peak" of the boundary signal (*b*), the signal amplitudes (*a*) and (*c*) are different.

In FIG. 6 two delays 40 are connected in series to produce two delayed video signals which combine with the original video signal to form three video signals.

The video signal which is supplied for detection is derived from the output from the first delay *b* and this output is supplied through two gates 42, 44 respectively. Gate 42 is controlled by a logic unit 46 while gate 44 is controlled by a logic unit 48. The logic unit 46 only opens gate 42 when the signal at *b* is greater than the signal at *a* (the output of the second delay) and the logic unit 48 only opens gate 44 when the signal at *b* is greater than the signal at *c* (the original video signal before delays 40). Thus video will only pass through the gates 42 and 44 when the signal at *b* corresponds to a boundary between two regions of different density to the boundary region.

Two later logic units 50 and 52 compare the video signals at *a* and *c* to determine which is the greater and in this way detect the asymmetry of the density profile of the boundary. The outputs from the logic units 50, 52 are supplied to AND-gates 54, 56 together with the video output from the gate 44. Thus in the case illustrated a bistable circuit 58 having set and reset inputs supplied with outputs from the AND-gates 54, 56 respectively is "set" when the video signal at *c* is greater than the video signal at *a* and when the video signal at *b* exceeds both *a* and *c* and is "reset" when the video signal at *a* exceeds the video signal at *c* and the video signal at *b* is greater than both *a* and *c*. The bistable circuit 58 can therefore be used to indicate at any instant whether the scanning spot is outside or inside the boundary provided that there is a distinguishable difference in density between the region inside and outside the boundary feature. In detection systems it is possible to increase the sensitivity of the system to features having more than one picture elements' extent in the scan direction. A simple arrangement is shown in FIG. 7 in which two additional video signals are obtained from a single video signal by the use of the two delays 60, 62 and the original video signal and the video signal from the two delays are added in an adding circuit 64 to form a single video signal to be passed to the subsequent detection circuit. In this arrangement the sensitivity of the system to features of three or more picture elements' extent in the scan direction is tripled.

It will be appreciated where a large number of delays are employed in the form of a matrix which includes delays so that picture elements can be examined in successive lines as well as in a single line, by selecting the delays given by the various delay units, radial lines of picture elements can be examined simultaneously. This enhances the sensitivity of the system to any straight line component of the picture and it is to be noted that this is one of the most important properties of the human eye.

If a system employing the arrangement of FIG. 7 scans across a broken line, it will fill the break or breaks in the line provided that these are not too big. This is a most important facility when working on images which consist of many straight lines some of which are near the limits which would normally be set by noise, shading etc. and which are known to have a very low probability of being accurately aligned end on and are separated by very few picture elements.

FIG. 8 illustrates an extension of the arrangement shown in FIG. 7 in which four delays 66 are used to generate five video signals. The outputs of the delays and the original video signal are connected in two sets of four to adding stages 68, 70 the selection of the first and fourth video signals in each of the two sets being such that the first and fourth video signal in each set is inverted with respect to the second and third video signals of each set. This gives four times the sensitivity to features of exactly two picture elements' width in the line scan direction.

By using a matrix of such delays including delays between lines, a system could be built up which is preferentially sensitive to features two picture elements wide in any direction. This type of preferential sensitivity is often useful particularly where one wishes to detect a structure such as a lattice network of lines without confusion from large patches of unwanted features.

FIG. 9 illustrates a detection system which is an extension of the arrangement shown in FIG. 6 for detecting a boundary feature. This arrangement is only suitable for nonreentrant boundary features. Such a feature is illustrated in FIG. 10 as comprising a ring one picture element thick. Five line scans are shown crossing the ring and the five lines are divided into five picture elements in the region of where they cross the boundary feature and the picture elements overlying the boundary feature are shown shaded.

In the arrangement shown in FIG. 9 a number of delays 67, 69, 40 are arranged in a matrix so as to produce video signals corresponding to five consecutive picture elements along each of five consecutive line scans. The outputs from the delays in advance of the central picture element which is the one under examination at any instant (output *b*) are supplied to an adding circuit 71 and the outputs from the delays following the delay supplying the central video signal are applied to an adding circuit 72. The signals applied to the two adding circuits form two signals *x* and *y* respectively. It can be shown that (for the scan direction shown) the sum of the picture elements to the right of the third (i.e. central) picture element will exceed the sum of those to the left of this picture element when entering a nonreentrant boundary feature while the sum of the elements to the right of center will be less than the sum of the elements to the left of center on leaving a nonreentrant boundary feature. The position of the boundary is detected in the same way as illustrated and described in FIG. 6 and the same reference numerals have been employed for the devices in FIG. 9 similar to those in FIG. 6. All points to the left and to the right of center are added up and weighted according to their distance from the center in the adding circuits 70 and 72 so as to produce two signals $x$ and $y$. Two comparison circuits 74, 76 determine whether $x$ or $y$ is the greater and operate in conjunction with the detected boundary position to set and reset a bistable circuit 58 by means of AND-gates 56 and 54 in the same way as illustrated in FIG. 6.

FIG. 11 of the drawings illustrates a further aspect of the present invention in which a tentative or provisional detection decision is confirmed or denied to form a final detection decision by comparing the decision made in response to information in one portion of a line scan with information from a following portion of the line scan. In a particular situation a line scan may partly intersect a sudden change in contrast, for example from white to black but since only a portion of the height of the line scan intersects the change in contrast the amplitude of the video signal resulting from the change in contrast will be less than if the scanning spot had intersected a complete black feature. A detection circuit will apparently detect a grey feature at that instant and if the detector has been set to respond to grey features and in accuracy it will occur. The arrangement illustrated in FIG. 11 is designed to hold the decision of the detection circuit for the duration of a line scan period and to compare the portion of the image immediately adjacent the portion containing the so-called grey feature in the previous line scan. If the adjacent portion is truly grey than the original decision was apparently correct and will be allowed by the logic circuitry. If however the adjacent portion of the image is black then the earlier decision is obviously incorrect and no true grey feature existed until the beginning of the transition from white to black.

In one such arrangement a detector such as illustrated in FIG. 1, 3, 4 or 6 is employed to generate a two-state signal corresponding to a tentative decision to which is then applied more elaborate criteria as described with reference to FIGS. 7, 8 or 9 adopting pure two-state logic techniques (i.e. where the ADD-modules are replaced by AND-modules etc.).

Another such arrangement in which the tentative detection systems are not shown is shown in FIG. 11. In this arrangement three detected outputs are taken from tentative detection means arranged to apply two thresholds so that three states are detected, i.e. darker than both lighter than both or between the two thresholds. The first two outputs correspond to black and white respectively ($b$ and $w$) and the third output is "tentatively grey" ($x$).

The $b$ and $w$ signals are passed through delays 80, 82 each having a delay equal to twice the line scan period while the ($x$) signal is passed through a delay 84 having a delay of only a single line period. In this way it is possible to observe the detected state of the lines before and after the $x$ signal. Logic units within the box 86 prevent the passage of the $x$ signal to the output 88 between two lines carrying black and white respectively and this avoids all "false" grey detection and gives only the true grey outputs ($g$).

In the systems described herebefore the signal storage devices referred to may comprise delay lines adapted to delay signals applied thereto by the required time intervals. Alternatively the signal storage devices may comprise one or more electronic shift registers.

I claim:

1. In a scanning system having a means for effecting line by line scanning in a given direction of an image to be detected by a scanning spot, the combination of: means for generating a first video signal corresponding to a first portion of said image, first storage means for storing said first signal for a first period of time equal to the length of time it takes the scanning spot to move a distance equal to the size of the scanning spot, means for generating a second signal at the end of said first period of time corresponding to a second portion of said image displaced from said first portion of said image by the size of said scanning spot, means for deriving a reference signal from said stored first signal, and means for comparing said second signal with said reference signal for generating a detection signal.

2. The scanning system of claim 1 wherein said means for deriving a reference signal derives said reference signal from said second signal as well as from said stored first signal.

3. The scanning system of claim 1 wherein said means for deriving a reference signal is means for generating a signal which is the arithmetic means of the maximum and minimum amplitudes of said first and second signals.

4. The scanning system of claim 1 further including second storage means for storing said second signal for a second period of time equal to said first period of time, means for generating a third signal at the end of said second period of time corresponding to a third portion of said image displaced from said second portion of said image by the size of said scanning spot.

5. The scanning system of claim 4 wherein said means for deriving a reference signal derives said reference signal from said second and third signals as well as from said first signal.

6. The scanning system of claim 5 wherein said means for deriving a reference signal is means for generating a signal which is the arithmetic means of the maximum and minimum amplitudes of said first, second and third signals.

7. The scanning system of claim 5 wherein said first and second storage means are connected in series, further including third and fourth storage means connected in series, said third and fourth storage means being identical to said first and second storage means and fifth and sixth storage means connected in series, said fifth and sixth storage means also being identical to said first and second storage means, seventh and eighth storage means connected in series, said seventh and eighth storage means being means for storing a signal for a time equal to the duration of a single scan line of said scanning means, said seventh storage means being connected between said first and third storage means and said eighth storage means being connected between said third and fifth storage means.

8. The scanning system of claim 5 further including a first circuit means for detecting the maximum level of said first, second and third signals and a second circuit means for detecting the minimum level of said first, second and third signals.

9. The scanning system of claim 8 including a first gate connected in series with said first circuit means and a second gate connected in series with said second circuit means, the output of said comparison means also being connected to said first and second gates, said gates being triggered to produce an output in response to the relative magnitudes of the output of said comparison means and the outputs of said first and second circuit means.

10. The scanning system of claim 4 further including means for electronically adding said first, second and third signals.

11. The scanning system of claim 4 further including third and fourth storage means identical to said first and second storage means, said four storage means being connected in series.

12. In a scanning system having a means for effecting line by line scanning in a given direction of a field for the detection of an image of the boundary type comprised of at least a thin line element having much thicker contrasting areas on both sides thereof, the combination of: means for generating a first video signal in a line scan corresponding to a first portion of said thin line element, means for generating a second video signal in said line scan corresponding to a second portion of said thin line element, means for generating a third signal in said line scan corresponding to a third portion of said thin line element, first means for storing said second signal for a predetermined period of time, second means for storing said first signal for a period of time equal to twice said predetermined period of time, means for comparing the relative magnitudes of said third signal with said first and second stored signals to produce a detection signal for said thin line element.

13. The scanning system of claim 12 further including first signal comparator means providing an output signal responsive to the relative magnitudes of said first and second signals and second signal comparator means providing an output signal responsive to the relative magnitudes of said second and third signals, first signal gating means controllable in response to the output signal of said first signal comparator means and second signal gating means controllable in response to the output signal of said second signal comparator means, said first and second signal gating means being effective to pass said second signal to a bistable circuit when said output signals of said first and second comparator means are at a predetermined value.

14. The scanning system of claim 13 further including third signal comparator means providing an output signal responsive to the relative magnitudes of said first and third signals, said output signal of said third signal comparator means being connected to switch said bistable circuit.

15. A scanning system for effecting line by line scanning of a field comprising means for detecting an image in said field, means for generating a conditional signal responsive to a predetermined image parameter, means for storing said conditional signal for a period equal to a whole line scan, means for generating a second signal responsive to the image portion being scanned at the end of said time period, means for comparing said conditional signal and said second signal, and means for generating a final signal based on said comparison.

16. The scanning system of claim 15 wherein said predetermined parameter is a grey image, further including second and third storage means for storing black and white images respectively for a time period equal to two whole line scans and wherein said means for comparing compares said conditional signal with signals stored in said second and third storage means as well as with said second signal.

17. The scanning system of claim 16 wherein said means for comparing includes at least one AND gate and one OR gate.

* * * * *